Jan. 4, 1949. J. S. MOORE 2,458,091
DISK HARROW HITCH LOCKING MEANS
Filed July 6, 1945 2 Sheets-Sheet 1
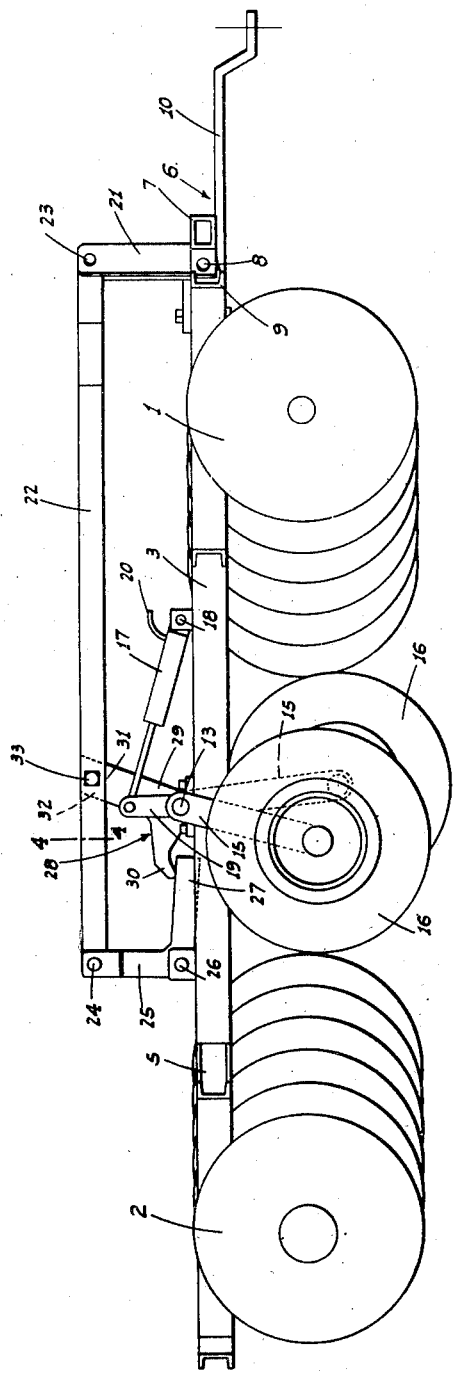
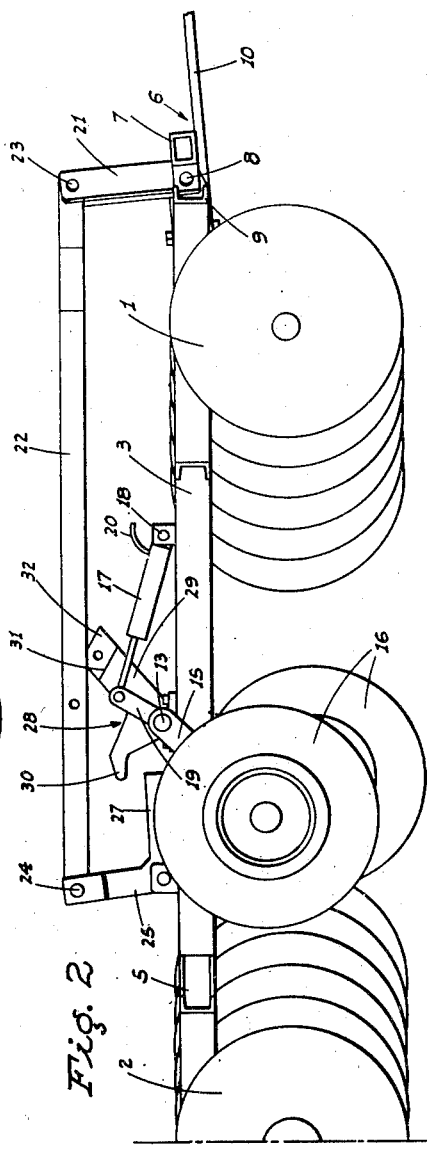
INVENTOR.
J. S. Moore
BY
ATTYS Jan. 4, 1949. J. S. MOORE 2,458,091
DISK HARROW HITCH LOCKING MEANS
Filed July 6, 1945 2 Sheets-Sheet 2
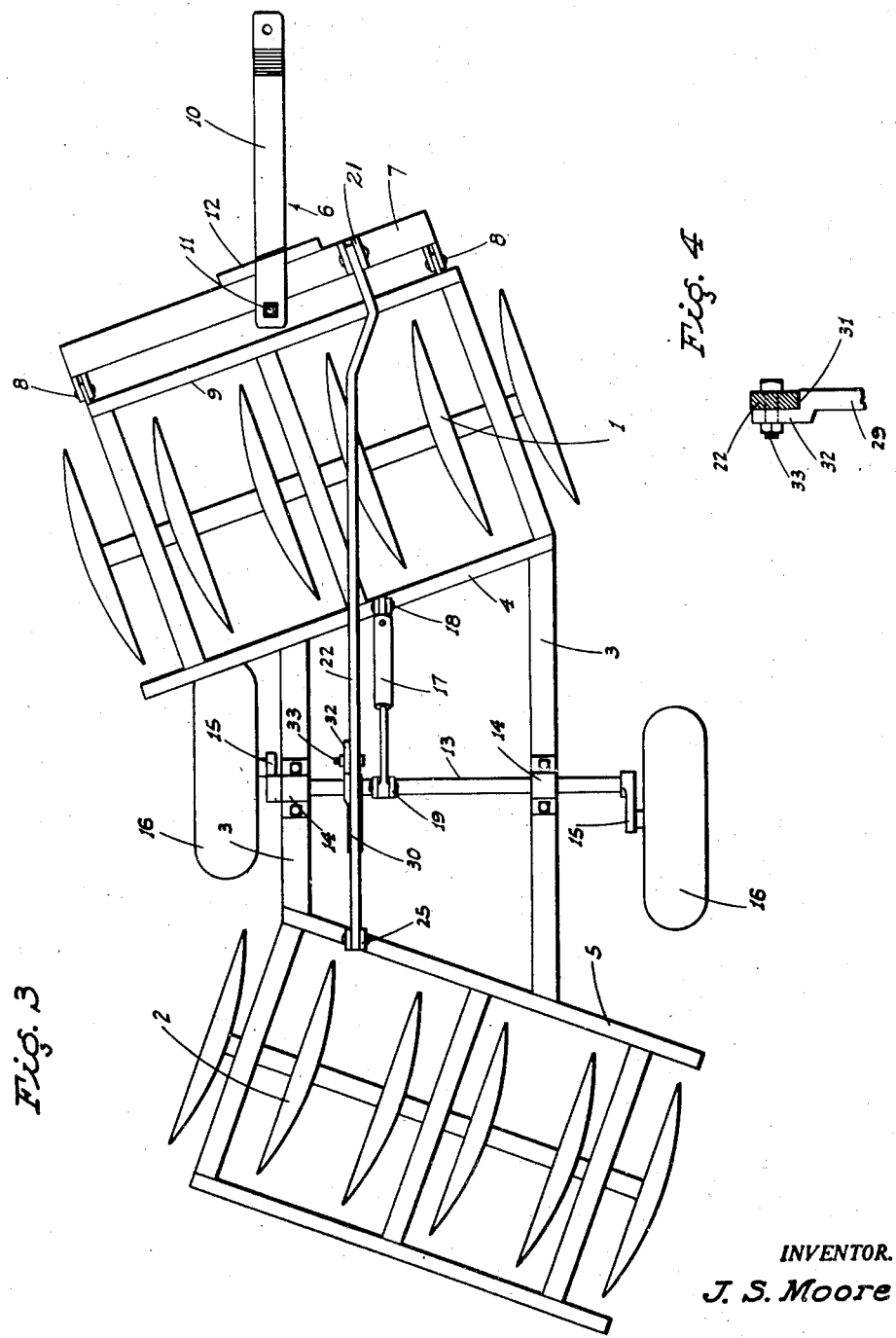
INVENTOR.
J. S. Moore
ATTYS Patented Jan. 4, 1949

2,458,091

UNITED STATES PATENT OFFICE 2,458,091

DISK HARROW HITCH LOCKING MEANS

John S. Moore, Modesto, Calif.

Application July 6, 1945, Serial No. 603,553

7 Claims. (Cl. 55—73)

1

This invention relates in general to improvements in agricultural implements.

In particular the invention is directed to, and it is an object to provide, a novel device to automatically lock, in a rigid position, the normally vertically swingable hitch assembly of a wheel-lift type ground working implement, such as a disc harrow, when the same is lifted by the wheels for the purpose of making turns in the field or for transport from place to place. Such locking of the normally vertically swingable hitch assembly is desirable in order to provide stability of the implement with advance thereof.

A further object of the present invention is to provide a locking device, as above, incorporated in a wheel-lift type implement wherein the actuation of the lift is by means of a fluid pressure actuated power cylinder; the locking device being directly and automatically responsive to operation of said cylinder.

An additional object of the invention is to provide a locking device, for the purpose described, which includes a rigid upstanding post on the normally vertically swingable hitch assembly, a rigid link pivoted to the post and extending rearwardly therefrom in overhanging relation to the implement and its wheel-lift mechanism, and means responsive to the wheel-lift mechanism arranged to lock said link against longitudinal movement when the implement is raised by said mechanism.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of the implement with the disc gangs in raised position.

Figure 2 is a side elevation of the implement with the disc gangs in lowered position.

Figure 3 is a plan view of the implement.

Figure 4 is a fragmentary cross section on line 4—4 of Fig. 1.

Referring now more particularly to the characters of reference on the drawings, the invention, although adaptable to many types of implements, is here shown in combination with an offset disc harrow of the fixed angled gang, wheel-lift type.

The implement includes a front gang 1 and a

2 rear gang 2; the gangs being disposed in fixed angled relation ot each other and thus maintained by longitudinally extending, transversely spaced rigid connecting beams 3 which extend between the rear beam 4 of the front gang 1 and the front beam 5 of the rear gang 2.

At its forward end the implement includes a normally vertically swingable hitch asssembly, indicated generally at 6, and which comprises the following:

A transverse, full width hitch bar 7 is disposed in parallel relation ahead of the front gang 1 and is vertically connected at its ends, as at 8, to the front beam 9 of said gang for normal vertical swinging movement. A forwardly projecting drawbar 10 is laterally adjustably clamped at its rear end in connection with the transverse hitch bar by means including a bolt 11 and a guided clamp 12. The drawbar 10 is adapted at its forward end for connection in draft relation to a tractor.

The disc harrow includes a wheel-type, power actuated lift comprising the following:

A transverse axle 13 extends between and is journaled, as at 14, in connection with the beams 3 substantially centrally between the front gang 1 and rear gang 2. At its outer ends and laterally beyond the beams 3 the axle is formed with depending cranks 15, on the outer ends of which wheels 16 are turnably mounted.

A fluid pressure actuated power cylinder 17 is pivotally connected between a bracket 18 on the rear beam 4 of the front gang 1 and an upstanding radial lever 19 on the axle 13; said power cylinder thus extending lengthwise of the implement and being disposed substantially centrally thereof.

The power cylinder 17 is adapted to be actuated from the tractor, and through the medium of a valve controlled fluid pressure system which includes a conduit 20 leading to said cylinder.

The cranks 15 are slightly offset relative to each other in a circumferential direction whereby one of the wheels 16 is disposed lower than the other at all times; the advantage of this feature being that when the wheels are in their relative elevated position of Fig. 2, and at which time the disc gangs are in ground working engagement, the lowermost wheel runs in one of the furrows in implement stabilizing relation.

When it is desired to raise the disc gangs clear of the ground, the power cylinder 17 is actuated to cause both of the wheels to relatively lower into ground engagement, and to such an extent that said gangs are lifted above the ground.

This wheel lift is used to clear the disc gangs from the ground when the implement is being turned at the end of the field, or for transport of the implement from place to place. However, when the implement is lifted clear of the ground by the wheel lift the normally vertically swingable hitch assembly 6 would permit the implement to teeter about the wheels and possibly dig into the earth, unless said hitch assembly is locked rigid with the remainder of the implement, and which is here accomplished as follows:

A relatively short upstanding post 21 is fixed on the transverse hitch bar 7 intermediate its ends and to one side of the drawbar 10. A rigid, substantially horizontal link 22 extends lengthwise of the implement in overhanging relation to the wheel lift, and said link is pivoted, at its forward end, as at 23, to the upper end of the post 21. At its rear end the link 22 is pivoted, as at 24, to the upper end of the upstanding leg of a bellcrank 25.

The bellcrank 25 is vertically swingably pivoted, intermediate its ends, as at 26, to the front beam 5 of the rear gang 2; the other leg 27 of said bellcrank projecting longitudinally forwardly from the pivot 26.

In longitudinal alinement with the bellcrank leg 27 the axle 13 is fixed with a substantially L-shaped latch, indicated generally at 28, which includes a leg 29 upstanding from the axle, and a leg 30 projecting rearwardly from the axle. The latch 28 is fixed on the axle 13 so that when the wheels 16 are in the raised position of Fig. 2, the latch 28 is clear of the other parts and inoperative.

However, when the axle 13 is rotated by the power cylinder 17 in a direction to relatively lower the wheels 16 to the implement lifting position of Fig. 1, the leg 30 abuts against the upper edge of the bellcrank leg 27. When this occurs the bellcrank is swung sufficiently to advance the link 22 to an extent to level the transverse hitch bar 7. At the same time a flat, upwardly facing shoulder 31 on the upper end of the leg 29 engages in abutting relation against the lower edge of the link 22 in the manner clearly shown in Fig. 1; the latch thereafter preventing vertical swinging movement of the hitch bar 7, and consequently the entire hitch assembly 6, from such level position. Thus, when the operator lifts the implement by the described wheel lift, and for the purpose of making a turn in the field, the hitch assembly is effectively maintained rigid relative to the remainder of the implement, which assures against the implement teetering, and against the forward end thereof tilting downwardly and possibly digging into the ground.

For transport of the implement in lifted position, and at which time it is desirable to relieve the power cylinder 17, the latch 28 is fixed in holding or locked relation to the link 22 as follows:

The leg 29 is formed at its upper end in laterally offset relation and extending above the shoulder 31, with an ear 32 having an opening adapted to register with a matching opening in said link. When the shoulder 31 is abutted against the lower edge of link 22, the ear 32 may be secured to said link by a cross bolt 33, which passes through such matching openings. When this bolt is in place, with the shoulder 31 abutting the lower edge of link 22, as well as leg 30 seating on bellcrank leg 27, the hitch bar 7 is locked against vertical swinging, and in addition the wheels are positively maintained in lowered position, which permits the power cylinder 17 to be relieved.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent is desired.

1. A holding mechanism for a normally vertically swingable hitch assembly of a ground working implement which includes a frame and a lift assembly mounted in connection with said frame; said mechanism including a rigid member upstanding from the hitch assembly, a link pivoted on a transverse axis in connection with the member and extending rearwardly therefrom, normally released means to hold said link against longitudinal movement, and means to place said holding means in operation upon actuation of the lift assembly; said holding means including a bellcrank pivoted in connection with the frame for swinging in a vertical plane, one leg of the bellcrank being upstanding and the link being pivoted thereto, the other leg of the bellcrank extending forwardly lengthwise of the implement, and said last named means including a latch movable to a hold-down position in engagement with said other leg of the bellcrank.

2. A holding mechanism for a normally vertically swingable hitch assembly of a ground working implement which includes a frame and a lift assembly mounted in connection with said frame; said mechanism including a rigid member upstanding from the hitch assembly, a link pivoted on a transverse axis in connection with the member and extending rearwardly therefrom, normally released means to hold said link against longitudinal movement, and means to place said holding means in operation upon actuation of the lift assembly; said holding means including a bellcrank pivoted in connection with the frame for swinging in a vertical plane, one leg of the bellcrank being upstanding and the link being pivoted thereto, the other leg of the bellcrank extending forwardly lengthwise of the implement, and said last named means including a latch turnable about a transverse axis, said latch including a pair of legs, one of said legs of the latch being movable to a hold-down position in engagement with said other leg of the bellcrank and the other leg of the latch including a shoulder movable into contact with the link whereby when the latch is so positioned the link is longitudinally immovable.

3. A holding mechanism as in claim 2 in which the lift assembly includes a transverse power actuated axle; said latch being fixed on the axle.

4. A holding mechanism as in claim 3 including an ear on said other leg of the latch positioned to lap the link when said shoulder engages the latter, the link and ear having openings then in matching relation, and a cross bolt adapted to engage through said matching openings.

5. A holding mechanism for a normally vertically swingable hitch assembly on the front of a tandem disc harrow including front and rear disc gangs, and a wheel-lift mounted intermediate the gangs; said holding mechanism comprising a rigid member fixed on and upstanding from the hitch assembly, a rigid elongated link pivoted at its forward end to said member on a transverse axis, the link extending rearwardly from the member above the harrow, and normally released holding means, operative upon actuation of the wheel lift, arranged to then maintain the link against longitudinal movement from a predetermined position; said holding means comprising a bell crank pivoted on the harrow with one leg upstanding and the other leg projecting forwardly, the rear end of the link being pivoted on a transverse axis to the upper end of said one leg of the bell crank, an L-shaped latch turnable about a transverse axis intermediate its ends, said latch being turnable to a position with one of its legs in hold-down relation to said other leg of the bell crank and with the other latch leg abutting the link from below, whereby when the latch is turned to said position the link is longitudinally immovable.

6. A holding mechanism as in claim 5 in which the wheel lift includes a power rotated axle; the latch being fixed on said shaft with the latch legs radiating therefrom.

7. In combination with a tandem disc harrow which includes a main frame, spaced front and rear disc gangs supported on the frame, a wheel lift mounted on the frame intermediate the gangs, and a normally vertically swingable hitch assembly connected with the front end of the main frame; a holding means to maintain the hitch assembly substantially immovable relative to the main frame when such frame is supported from the ground on the wheel lift, such holding means including a link pivotally mounted on the hitch assembly on a transverse axis and projecting longitudinally of the frame, an upstanding lever pivoted on the frame separately from the wheel lift, the rear end of the link being pivoted on the free end of the lever, and normally released latch means interposed between the lever and link and carried in part by the wheel lift and operative in response to movements of said lift to lock the lever and link against relative movement when the frame is supported from the ground by the wheel lift.

JOHN S. MOORE.

REFERENCES CITED

The following references are of record in the file of this patent:

UNITED STATES PATENTS

| Number | Name | Date |
|---|---|---|
| 1,675,461 | Paul | July 3, 1928 |
| 2,320,742 | Newkirk | June 1, 1943 |